Patented June 23, 1936

2,044,968

UNITED STATES PATENT OFFICE 2,044,968

METAL SALTS OF OXYACEDIC ACIDS

Herman A. Bruson, Germantown, Pa., assignor to The Resinous Products & Chemical Co. Inc., Philadelphia, Pa.

No Drawing. Application January 23, 1932, Serial No. 588,499

17 Claims. (Cl. 260—11)

This invention describes the preparation of certain new metal salts of organic acids, said salts being readily soluble in oils and in organic solvents.

One object of this invention is to provide a class of metal salts which may be dispersed at ordinary temperature in animal or vegetable oils of the so-called "drying" or "semi-drying" type, and which are also miscible with petroleum naphtha; these salts functioning as siccatives or driers for the oils.

Another object of this invention is to provide a class of metal salts which may be employed as waterproofing agents for textiles and as resins for use in coating compositions of the most diverse nature such as in oilpaints, varnishes and nitrocellulose lacquers.

Still another object of this invention is to provide a new group of toxic metal salts such as those of mercury, lead, bismuth, copper, antimony, silver and gold which are soluble in oils or petroleum and which may be applied in the form of salves or ointments to infected tissues for destroying microorganisms.

I have found that if acids having the general formula shown below are converted into their water-insoluble metal salts bodies are obtained, which when anhydrous, are readily soluble in hydrocarbons of aromatic, aliphatic, or hydroaromatic nature such as in benzene, hexane, petroleum naphthas or turpentine. These new salts furthermore can readily be dispersed at room temperature or at slightly elevated temperature in drying oils such as raw linseed oil, bodied linseed oils, fish oils, tung oil, perilla oil, soya bean oil and in paints, varnishes and coating compositions prepared therefrom. They are also soluble in non-drying or semi-drying oils such as castor oil, rape seed oil, olive oil; and in mineral oils or waxes such as paraffin oil, petrolatum, and paraffin wax. In addition, these salts can be added to solutions of synthetic resins of the phenolaldehyde type or polyhydric alcohol-polybasic acid type, especially those more recent synthetic resins of these classes known as alkyd resins which are prepared from drying oils or from drying oil fatty acids, in order to accelerate their rate of drying.

The acids from which these metal salts are derived possess the general formula $$R-O-CH_2-COOH$$

where R denotes any one of the following groups or radicles:

(a) An alkyl group having more than five carbon atoms.
(b) An aryl group bearing at least one alkyl side chain substituent which has more than four carbon atoms in a normal straight chain.
(c) A hydroaromatic radical.

Typical examples of such acids are the following:

(a) N-hexyloxyacetic acid, sec-hexyloxyacetic acid, N-heptyloxyacetic acid, capryloxyacetic acid, N-octyloxyacetic acid, N-decyloxyacetic acid and their homologues or isomeric alkoxyacetic acids.

(b) p-N-amylphenoxyacetic acid, p-sec-amyl phenoxyacetic acid, p-sec-hexyl phenoxyacetic acid, p-sec-octyl phenoxyacetic acid, octyl cresoxyacetic acid, sec-amylnaphthoxyacetic acid.

(c) Cyclohexyloxyacetic acid, methyl cyclohexyloxyacetic acid, menthyloxyacetic acid, fenchoxyacetic acid, bornyloxyacetic acid, trihydrocymenoxyacetic acid.

From these acids the metal salts which are the object of this invention are prepared by treating the free acids with an oxide, hydroxide, or carbonate of the desired metal. An alternative method is to convert the acids into water-soluble alkali metal salts such as the sodium or potassium salt, and react upon an aqueous solution of such salt with an aqueous solution of a salt of the desired metal so as to effect a double decomposition by precipitation. It is advantageous in both cases to carry out the reaction in the presence of an organic solvent for the metal salt which is to be formed.

The principal salts of the above acids coming into consideration for use as siccatives are the cadmium, cerium, chromium, cobalt, copper, iron, lead, manganese, mercury, nickel, thallium, tin, uranium, vanadium, and zinc salts.

For use as colorless resins and as waterproofing agents the principal salts of the above acids are the aluminum, barium, calcium, magnesium, strontium, titanium, and zinc salts. The antimony, bismuth, copper, gold, mercury, and silver salts may find application as toxic agents against microorganisms.

In order to illustrate this invention more clearly the following examples are given:

EXAMPLE 1

Capryloxyacetic acid,

is prepared by dissolving 46 grams sodium in a mixture of 285 grams capryl alcohol and 285 grams dry xylene at 110–120° C. and then gradually adding a solution of 95 grams monochloracetic acid in 200 grams hot xylene. After heating the mixture 2–3 hours at 80–100° C. the product is cooled, diluted with water and distilled with steam to remove xylene and excess capryl alcohol. Upon acidifying the clear, alkaline solution obtained, crude capryloxyacetic acid separates as a pale, reddish oil which is purified by distillation, preferably in vacuo. It is a colorless oil, insoluble in water, and boiling at 167° C. under 24 m. m. pressure.

This acid was neutralized with a 10% solution of sodium hydroxide and then treated with excess of a 15% lead nitrate solution. Lead capryloxyacetate is precipitated as a white, dough-like mass. It may be washed and dried in vacuo at 105° C. Preferably however, it is dissolved in toluene or in ethylene dichloride and the solution thus obtained washed several times with water. After separating the water, the clear solution which remains is steam distilled to recover the organic solvent and the residue dried in vacuo at 105° C.

Anhydrous lead capryloxyacetate is a transparent, sticky, colorless resin containing 35% lead calculated as metal. It dissolves at room temperature in petroleum naphtha to give non-viscous colorless, stable solutions which may be dispersed directly in drying oils, alkyd resins, or in paints and varnishes for use as a siccative as is generally practiced in the art at present with the known siccatives. It also dissolves readily in raw and 12-hour boiled linseed oil at about 40° C. to give clear stable solutions of high lead content. Such mixtures dry more rapidly than if lead capryloxyacetate is absent. They show practically no discoloration since the lead compound is readily incorporated without undue heating. Varnishes prepared in this manner show a minimum of after-yellowing as compared with those containing the present well known lead siccatives.

Manganese capryloxyacetate may similarly be obtained by adding a solution of water-soluble manganese salt such as manganous sulfate or manganese acetate in excess to a solution of sodium or potassium capryloxyacetate. The anhydrous manganese capryloxyacetate is a pale red, transparent flexible resin which contains 13% manganese chemically combined. Its solutions in oils and organic solvents such as varnish maker's naphtha are almost colorless even at high concentrations. It is an excellent siccative.

Cobalt capryloxyacetate is a dark blue, soap-like solid, readily soluble in the cold in petroleum distillates.

Aluminum capryloxyacetate is a colorless, transparent rubbery resin. It forms solutions in toluol which are relatively non-viscous as compared to those of aluminum stearate. It is an excellent waterproofing agent for textiles.

The other water-insoluble metal salts may likewise be prepared or they may be made by heating the free acid with the oxide, hydroxide, or carbonate of the desired metal at 110–150° C., preferably in the presence of a high boiling solvent such as xylene.

10 grams of capryloxyacetic acid were boiled 4 hours under reflux with 7 grams of bismuth hydroxide in 50 grams of xylene. About 25 grams of xylene were then distilled off to remove the water that was formed. The residue was filtered and the remaining xylene evaporated at reduced pressure leaving pure bismuth capryloxyacetate as a pale waxy mass which is soluble in warm olive oil.

In an analogous manner the other water-insoluble metal salts enumerated herein may be made.

In place of the capryloxyacetic acid, the preparation of which has been given since it is a new compound, one may use the already known n-octyloxyacetic acid which may be prepared by condensing sodium octylate with chloracetic acid as described by Rule, Hay, and Paul (J. Chem. Soc. 1928, pp. 1347–1361) or one may use any hexyl-, heptyl-, nonyl-, decyl- or higher homologous oxyacetic acid or mixtures thereof. For instance the mixture of higher monohydric alcohols obtained as a by-product from the synthetic manufacture of methanol by the catalytic treatment of hydrogen and carbon monoxide, and comprising the fraction boiling substantially at 160–220° C. may be converted into alkali metal alcoholate and condensed with monochloracetic acid or sodium monochloracetate as described above to give a mixture of various isomeric alkoxyacetic acids boiling at 150–165° C. under 29 m. m. pressure. This mixture of acids consists essentially of isomeric octyl- and possibly higher oxyacetic acids, and is a colorless oil, insoluble in water and having a strong odor as of perspiration. Its water-insoluble metal salts are exceedingly soluble in oils and hydrocarbons. The lead salt is a colorless, waxy, soft resin containing 35.9% combined lead. The manganese salt containing 13% combined manganese is a pale tan, transparent, hard, flexible resin, the solutions of which are practically colorless in contrast to those of the manganese salts of stearic or oleic acids which are dark brown. It is an excellent siccative for varnishes. The cobalt salt is a dark blue resin containing 13% combined cobalt and is readily soluble in turpentine.

EXAMPLE 2

One mole of para-sec-hexyl phenol such as may be prepared by condensing phenol with sec-hexyl alcohol by means of 70% sulphuric acid, is dissolved in a solution of 120 grams sodium hydroxide in 1 liter of 80% alcohol and mixed with 142 grams of monochloracetic acid dissolved in 300 ccm. water. The mixture is then boiled under reflux for about 8 hours. The excess alcohol is then distilled off with steam and the residue acidified with dilute sulphuric acid. Crude p-sec-hexylphenoxyacetic acid,

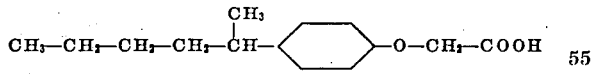

separated as a dark red oil which upon distillation in vacuo came over as a pale yellow oil boiling at 174–178° C. under 1 m. m. pressure.

The water-insoluble metal salts of this new acid, such as the lead, cobalt, manganese, aluminum, zinc, bismuth, etc. are readily soluble in oils and in hydrocarbons. They are resinous, brittle solids which may readily be powdered. These salts are prepared from the above acid by methods analogous to those set forth in Example 1.

p-caprylphenoxyacetic acid (made from p-caprylphenol, chloracetic acid, and alkali; and which forms a pale brown oil insoluble in water and which could not be distilled in vacuo without decomposition) was converted into its lead, cobalt and manganese salts by neutralizing the free acid with potassium hydroxide solution and precipitating the respective salts by adding solutions of lead acetate, cobalt sulphate, and manganous chloride. The precipitates were taken up in toluene, the aqueous layer separated, the toluene layer filtered, and then the toluene removed in vacuo at 80° C. The lead salt was a hard resinous mass which when ground gave a pale yellow powder that dispersed readily in linseed oil and in varnish makers' naphtha. The manganese salt was a dark brown powder which dissolved in toluol to give a dark brown solution. The cobalt salt was a deep blue powder giving blue solutions in varnish thinners. The other water-insoluble metal salts such as the aluminum, zinc, nickel, iron, chromium, mercury, etc. are also soluble in oils and in hydrocarbons.

EXAMPLE 3

*Salts of trihydro-cymenoxy acetic acid*

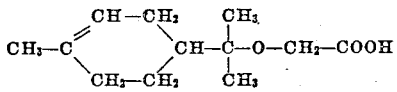

In a vessel fitted with a stirrer and reflux condenser is placed a mixture of 400 grams commercial alpha-terpineol (any of the isomers or mixtures thereof) and 46 grams metallic sodium. The mixture is heated while stirring at 110-125° C. until practically all the sodium has dissolved. To the hot solution there is then added gradually while stirring constantly at about 95-105° C. a solution of 85 grams monochloracetic acid in 85 grams of terpineol or in 150 grams of xylene, care being taken that the temperature, due to the exothermal reaction, does not exceed 140° C. After about 4 hours heating at 100° C. the mixture is cooled, treated with a liter of water and steam distilled to recover excess terpineol and xylene. Upon acidifying the still residue with dilute mineral acid, trihydroxy-cymenoxy acetic acid separates as a pale oil. It can be purified by reprecipitation from a filtered alkaline solution. This new acid does not crystallize on long standing and can not be distilled in high vacuo without complete decomposition.

Its cobalt, manganese, and lead salts were prepared by adding to neutral solutions of the sodium salt of the acid, a slight excess of cobalt sulfate, manganous chloride, and lead nitrate, respectively. The metal salts separated as amorphous masses which when washed and thoroughly dried in vacuo at 105-110° C. formed hard powders that were readily soluble in toluol, ligroin, varnish makers' naphtha, raw or heavy bodied linseed oil, tung oil, alkyd resins (made by condensing linseed oil or drying oil acids with polyhydric alcohols and polybasic acids) paints, varnish, printing oils and the like, and behaved therein as siccatives. The amount of the salt required as a siccative is that which will give about .05% manganese or cobalt or 1% lead calculated as metal on the weight of the oil to be dried. By incorporating such salts or mixtures thereof in drying oil compositions in the proportions given, a rapid acceleration of the drying is attained. The other water insoluble metal salts may be prepared in a similar manner.

EXAMPLE 4

*Salts of fenchoxyacetic acid*

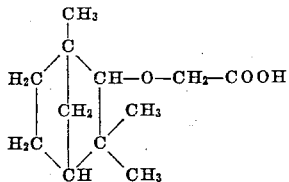

To a mixture of 120 grams fenchyl alcohol and 150 grams dry xylene, 23 grams sodium or 39 grams potassium are added and the mixture heated at 110-125° C. while stirring. After the metal is dissolved, 90 grams sodium monochloracetate (or 100 grams potassium monochloracetate, or 40 grams chloracetic acid) is gradually added in small portions during the course of about an hour and heating continued thereafter for an additional four hours at 100° C. The mixture is then diluted with an equal volume of water and steam distilled until oily drops no longer come over. The residue is filtered and the clear filtrate is acidified, whereupon crude fenchoxyacetic acid precipitates in fine colorless crystals which, after recrystallization from ligroin, melts at 122° C. The anhydrous lead salt of this new acid is a white powder readily soluble in drying oils and in varnish makers' naphtha in the cold, and is an excellent siccative for oils, paints, and varnishes. The cobalt and manganese salts were prepared by boiling the acid with the metal carbonates in xylene, removing the water, and recovering the corresponding fenchoxyacetates from the solution. The aluminum, zinc, barium, nickel, and iron salts are soluble in hot linseed oil.

By condensing borneol in place of fenchol as described above, bornyloxyacetic acid was obtained. It melts at 81° C. Its water-insoluble metal salts are likewise soluble in hot oil.

By condensing the sodium alcoholate of cyclohexanol with chloracetic acid, cyclohexyloxyacetic acid C₆H₁₁—O—CH₂—COOH was prepared. It is a colorless, somewhat viscous oil boiling at 168-175° C. under 32 m. m. Its lead salt is a colorless transparent brittle resin which dissolves in ligroin and other petroleum distillates at room temperature to form colorless solutions which may be used as siccatives in paints and oil varnishes.

The above illustrations describe the general processes for making the compounds herein set forth. These acids are obtainable in other ways for example by the careful oxidation of the corresponding glycol monoethers according to the equation

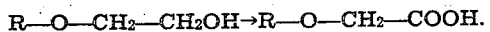

The above described metal salts possess distinct advantages over the siccatives at present in use commercially such as the resinates, linoleates, tungates, benzoates, borates, and naphthenates, in that they are very much more soluble and stable in drying oils and in paints and varnishes prepared therefrom, especially when thinned with aliphatic hydrocarbon solvents.

As illustrative of the general method for employing the compounds herein mentioned as siccatives, linseed oil, tung oil or any mixture of such drying oils, alone or in combination with resins and/or pigments as in oilpaints, varnishes or auto-oxidizable resin compositions is mixed directly with a solution of cobalt capryloxyacetate in varnish makers' naphtha or in a xylene solution of alkyd resins. The amount of the cobalt capryloxyacetate used is very small, about 0.1% on the weight of the oil which is to be dried being sufficient to give a rapid acceleration of the drying rate. One may also use lead capryloxyacetate, manganese capryloxyacetate, cerium capryloxyacetate, nickel capryloxyacetate and zinc capryloxyacetate or mixtures of any two or more of these salts to obtain special film characteristics such as greater through-drying and hardness.

In a similar manner the siccative metal salts of the other R—O—CH₂—COOH type acids described herein may be employed for drying autooxidizable drying compositions, the quantities used being substantially the same as are employed at present in the art, namely about .01% to .05% manganese or cobalt or .1% to 1% lead calculated as metal on the weight of the oil to be dried.

The aluminum, zinc, calcium and barium salts being colorless and soluble in mixtures of butyl acetate and toluol may be directly blended with nitrocellulose lacquers and used therein as colorless resins.

The bismuth salts of the above acids may be mixed directly in olive oil on slight warming to give clear stable solutions having valuable bactericidal and fungicidal properties. The salts of mercury, lead, copper, antimony, silver and gold and the like may also be employed in the same manner.

What I claim is:

1. The process of making a resinous compound which comprises heating a substance of the group consisting of an oxide, hydroxide and carbonate of a polyvalent metal with an equivalent amount of an ether acid of the general formula R—O—CH₂—COOH wherein R is a hydrocarbon radical of the group consisting of hydroaromatic radicals, alkyl radicals having more than five carbon atoms, and aryl radicals having at least one side chain substituent which has more than four carbon atoms in a straight chain, until the acid is neutralized.

2. The process of making a resinous compound which comprises heating a substance of the group consisting of an oxide, hydroxide and carbonate of a polyvalent metal with an equivalent amount of an ether acid of the general formula R—O—CH₂—COOH wherein R is a hydrocarbon radical of the group consisting of hydroaromatic radicals, alkyl radicals having more than five carbon atoms, and aryl radicals having at least one side chain substituent which has more than four carbon atoms in a straight chain, in the presence of an organic solvent, until the acid is neutralized.

3. A salt of a polyvalent metal having the general formula (R—O—CH₂COO)$_x$M wherein M is a polyvalent metal, $x$ its valence, and R is a hydrocarbon radical of the group consisting of hydroaromatic radicals, alkyl radicals having more than five carbon atoms, and aryl radicals having at least one alkyl side-chain substituent which has more than four carbon atoms in a straight chain, said salt being a resinous body readily soluble in aromatic hydrocarbons.

4. A salt of a heavy metal having the general formula (R—O—CH₂COO)$_x$M wherein M is a heavy metal, $x$ its valence, and R is a hydrocarbon radical of the group consisting of hydroaromatic radicals, alkyl radicals having more than five carbon atoms, and aryl radicals having at least one alkyl side-chain substituent which has more than four carbon atoms in a straight chain, said salt being a resinous body readily soluble in aromatic hydrocarbons.

5. A salt of a polyvalent metal having the general formula (R—O—CH₂COO)$_x$M wherein M is a polyvalent metal, $x$ its valence, and R is an octyl group, said salt being a resinous body readily soluble in aromatic hydrocarbons.

6. A salt of a heavy metal having the general formula (R—O—CH₂COO)$_x$M wherein M is a heavy metal, $x$ its valence, and R is an octyl group, said salt being a resinous body readily soluble in aromatic hydrocarbons.

7. A salt having the general formula (R—O—CH₂COO)$_x$M wherein M is a metal, $x$ its valence and R is a hydrocarbon radical of the group consisting of hydroaromatic radicals, alkyl radicals having more than five carbon atoms, and aryl radicals having at least one alkyl side-chain substituent which has more than four carbon atoms in a straight chain.

8. A salt of a polyvalent metal having the general formula (R—O—CH₂COO)$_x$M wherein M is a polyvalent metal, $x$ its valence, and R is an aliphatic hydrocarbon radical containing more than five carbon atoms, said salt being a resinous body readily soluble in aromatic hydrocarbons.

9. A salt of a polyvalent metal having the general formula (R—O—CH₂COO)$_x$M wherein M is a polyvalent metal, $x$ its valence, and R is a branched-chain aliphatic hydrocarbon radical containing more than five carbon atoms, said salt being a resinous body readily soluble in aromatic hydrocarbons.

10. A salt of a heavy metal having the general formula (R—O—CH₂COO)$_x$M wherein M is a heavy metal, $x$ its valence, and R is an aliphatic hydrocarbon radical containing more than five carbon atoms, said salt being a resinous body readily soluble in aromatic hydrocarbons.

11. A salt of a heavy metal having the general formula (R—O—CH₂COO)$_x$M wherein M is a heavy metal, $x$ its valence, and R is a branched-chain aliphatic hydrocarbon radical containing more than five carbon atoms, said salt being a resinous body readily soluble in aromatic hydrocarbons.

12. A salt of a metal having the general formula (R—O—CH₂COO)$_x$M wherein R is an alkyl radical having from six to ten carbon atoms M is a metal chosen from the group consisting of cobalt, manganese, and lead, and $x$ has a value of two, said salt being a resinous body readily soluble in aromatic hydrocarbons.

13. A salt of a polyvalent metal having the formula

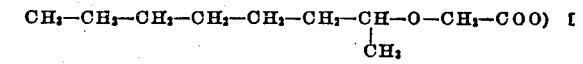

wherein M is a polyvalent metal and $x$ its valence, said salt being a resinous body readily soluble in aromatic hydrocarbons.

14. A salt of a polyvalent metal having the general formula (R—O—CH₂COO)$_x$M, wherein M is a polyvalent metal, $x$ its valence and R is a cyclohexyl group, said salt being a resinous body readily soluble in aromatic hydrocarbons.

15. A salt of a heavy metal having the general formula (R—O—CH₂COO)$_x$M, wherein M is a heavy metal, $x$ its valence, and R is a cyclohexyl group, said salt being a resinous body readily soluble in aromatic hydrocarbons.

16. A salt of a polyvalent metal having the general formula (R—O—CH₂COO)$_x$M, wherein M is a polyvalent metal, $x$ its valence and R is a p-capryl-phenyl group, said salt being a resinous body readily soluble in aromatic hydrocarbons.

17. A salt of a heavy metal having the general formula (R—O—CH₂COO)$_x$M, wherein M is a heavy metal, $x$ its valence and R is a p-caprylphenyl group, said salt being a resinous body readily soluble in aromatic hydrocarbons.

HERMAN A. BRUSON.

Certificate of Correction

Patent No. 2,044,968. June 23, 1936.

HERMAN A. BRUSON

It is hereby certified that errors appear in the above numbered patent requiring correction as follows: In the heading to the printed specification, title of invention, for the word "OXYACEDIC" read *Oxyacetic;* page 4, second column, line 48–50, claim 13, strike out the formula and insert instead the following:

and that the said Letters Patent should be read with these corrections therein that the same may conform to the record of the case in the Patent Office.

Signed and sealed this 13th day of October, A. D. 1936.

[SEAL]

HENRY VAN ARSDALE,
*Acting Commissioner of Patents.*

Certificate of Correction

Patent No. 2,044,968. June 23, 1936.

HERMAN A. BRUSON

It is hereby certified that errors appear in the above numbered patent requiring correction as follows: In the heading to the printed specification, title of invention, for the word "OXYACEDIC" read *Oxyacetic;* page 4, second column, line 48-50, claim 13, strike out the formula and insert instead the following:

and that the said Letters Patent should be read with these corrections therein that the same may conform to the record of the case in the Patent Office.

Signed and sealed this 13th day of October, A. D. 1936.

[SEAL]

HENRY VAN ARSDALE,
*Acting Commissioner of Patents.*